(12) United States Patent
Goh et al.

(10) Patent No.: US 8,053,912 B2
(45) Date of Patent: Nov. 8, 2011

(54) ELECTRIC POWER GENERATOR FOR A BICYCLE

(75) Inventors: Jayson Goh, Osaka (JP); Masao Shoji, Osaka (JP)

(73) Assignee: Cateye Co., Ltd., Osaka (JP)

( * ) Notice: Subject to any disclaimer, the term of this patent is extended or adjusted under 35 U.S.C. 154(b) by 334 days.

(21) Appl. No.: 12/322,122

(22) Filed: Jan. 29, 2009

(65) Prior Publication Data

US 2009/0284020 A1 Nov. 19, 2009

(30) Foreign Application Priority Data

May 16, 2008 (JP) .................................. 2008-129336

(51) Int. Cl.
*F03G 7/08* (2006.01)
(52) U.S. Cl. ........................................................ 290/1 R
(58) Field of Classification Search .................. 290/1 R, 290/42, 53; 60/398; 310/15, 25, 36, 37; 180/2.1, 2.2

See application file for complete search history.

(56) References Cited

U.S. PATENT DOCUMENTS

| | | | | |
|---|---|---|---|---|
| 4,412,355 A | * | 10/1983 | Terbrack et al. | 398/111 |
| 4,500,827 A | * | 2/1985 | Merritt et al. | 322/3 |
| 5,175,457 A | * | 12/1992 | Vincent | 310/15 |
| 5,909,068 A | * | 6/1999 | Wakiwaka et al. | 310/15 |
| 6,538,349 B1 | * | 3/2003 | Lee et al. | 310/15 |
| 6,897,573 B1 | * | 5/2005 | Shah | 290/1 A |
| 7,142,075 B1 | * | 11/2006 | Roesler et al. | 335/78 |
| 7,498,681 B1 | * | 3/2009 | Kellogg et al. | 290/1 R |
| 7,795,763 B2 | * | 9/2010 | Harris et al. | 310/12.16 |
| 2006/0145547 A1 | * | 7/2006 | Kraus | 310/36 |
| 2007/0024126 A1 | | 2/2007 | Brennvall | |
| 2008/0197720 A1 | * | 8/2008 | Matsumoto et al. | 310/15 |

FOREIGN PATENT DOCUMENTS

| | | |
|---|---|---|
| DE | 19910057 A1 | 9/2000 |
| DE | 19910057 A1 | 9/2000 |
| JP | 2005-151750 A | 9/2005 |
| JP | 3121655 U | 4/2006 |
| JP | 2006-296144 A | 10/2006 |
| WO | WO 97/30308 A | 8/1997 |
| WO | WO 2005/072074 A | 8/2005 |

* cited by examiner

*Primary Examiner* — Tho D Ta
(74) *Attorney, Agent, or Firm* — Olson & Cepuritis, Ltd.

(57) ABSTRACT

A vibration electric power generator includes an iron core having a coil wound therearound, a magnet member relatively moved with respect to the iron core by vibrations caused during running of a bicycle; and a nonmagnetic member fixed to the iron core and being in close contact with the magnet member. A plurality of magnets are stacked such that identical poles face each other. Switching is realized, by the vibrations caused during the running of the bicycle, between a state in which a first protrusion of the iron core is attracted and brought into contact with a north pole magnetism collecting and permeative plate and a second protrusion of the iron core is attracted and brought into contact with a south pole magnetism collecting and permeative plate and a state in which the second protrusion is attracted and brought into contact with a north pole magnetism collecting and permeative plate and the first protrusion is attracted and brought into contact with a south pole magnetism collecting and permeative plate.

5 Claims, 5 Drawing Sheets

ELECTRIC POWER GENERATOR FOR A BICYCLE

BACKGROUND OF THE INVENTION

1. Field of the Invention

The present invention relates to a vibration electric power generator, and in particular to a vibration electric power generator using the electric power generated from vibrations during running of a bicycle.

2. Description of the Background Art

As an electric power generator for a bicycle, a roller dynamo generating electric power by pressing a roller against a tire, and a hub dynamo using an axle as an electric power generator have been conventionally known.

In the roller dynamo, since a roller is pressed against the outer periphery of a tire, a large energy loss is caused due to friction. In contrast, in the hub dynamo, although an energy loss caused due to friction is small, mounting a hub dynamo to a bicycle requires replacement of a wheel.

On the other hand, an electric power generation device generating electric power by linearly moving a movable body having a magnet mounted thereto has been conventionally known.

For example, Japanese Patent Laying-Open No. 2005-151750 (Patent Document 1) describes placing a yoke having a permanent magnet fixed thereto to face an iron core having a coil wound therearound.

Further, Japanese Patent Laying-Open No. 2006-296144 (Patent Document 2) describes a vibration electric power generator in which movable magnets are provided such that north poles (or south poles) thereof face each other with a magnet spacer interposed therebetween.

Furthermore, Japanese Utility Model Registration No. 3121655 (Patent Document 3) describes generating electric power by the action of reciprocating movement produced by vibrations caused during running of a vehicle, and charging the electric power in a battery.

When electric power is generated using pedaling power as in a roller dynamo and a hub dynamo, a loss of energy is caused inevitably. In response to this issue, the inventors of the present application have considered generating electric power using vibrations caused during running of a bicycle.

However, vibrations caused during running of a bicycle cannot necessarily be used effectively for electric power generation by merely applying the configurations described in Patent Documents 1 to 3 to a bicycle. For example, in a linear actuator described in Patent Documents 1 to 3, a space is formed between the magnet and the iron core, and as a result, electromotive force cannot necessarily be obtained sufficiently when the number of vibrations is small and the amplitude of the vibrations is also small.

SUMMARY OF THE INVENTION

One object of the present invention is provide a vibration electric power generator capable of obtaining electric power by effectively using vibrations caused during running of a bicycle without a loss of energy.

A vibration electric power generator in accordance with the present invention is a vibration electric power generator generating electric power using vibrations caused during running of a bicycle, including: an iron core having a coil wound therearound; a magnet member formed by stacking a plurality of magnets, and relatively moved with respect to the iron core by the vibrations caused during the running of the bicycle; a plurality of plate-like members having magnetic permeability and being inserted between the plurality of magnets; and a nonmagnetic member fixed to the iron core and being in close contact with the magnet member. The plurality of magnets are stacked such that identical poles face each other. The iron core has a first pole and a second pole facing each other and provided at a location opposite to the coil and being in close contact with the plurality of plate-like members together with the nonmagnetic member. The plurality of plate-like members include a first plate-like member sandwiched between north poles of the plurality of magnets, and a second plate-like member sandwiched between south poles of the plurality of magnets. Switching is realized, by the vibrations caused during the running of the bicycle, from a first state in which the first pole is attracted and brought into contact with the first plate-like member and the second pole is attracted and brought into contact with the second plate-like member, to a second state in which the second pole is attracted and brought into contact with the first plate-like member and the first pole is attracted and brought into contact with the second plate-like member.

According to the configuration described above, electric power can be generated by electromagnetic induction due to the vibrations caused during the running of the bicycle, by performing switching between the first state and the second state by the vibrations caused during the running of the bicycle. The magnetic flux density around the plurality of plate-like members sandwiched by the plurality of magnets can be increased by stacking the plurality of magnets such that the identical poles face each other. Further, by establishing close contact between the iron core (the first pole and the second pole) and the magnet member (the first plate-like member and the second plate-like member), a gap within a magnetic circuit between the magnet and the iron core can be eliminated, and the magnetic resistance can be reduced. Furthermore, by bringing the nonmagnetic member fixed to the iron core into close contact with the magnet member, relative movement of the magnet member with respect to the iron core can be guided. Consequently, electric power can be obtained using the vibrations caused during the running of the bicycle effectively without a loss of energy.

Preferably, in the vibration electric power generator described above, the plurality of magnets are stacked vertically.

During the running of the bicycle, vibrations are produced most stably and continuously. The vertical vibrations caused during the running of the bicycle can be used effectively by stacking the plurality of magnets vertically as described above.

Preferably, in the vibration electric power generator described above, the magnet member is fixed to a saddle of the bicycle, and the iron core is fixed to a base wire fixed to a seat post clamp of the bicycle.

Vibrations are caused in the saddle during the running of the bicycle. By providing the vibration electric power generator to the saddle as described above, electric power can be generated using the vibrations of the saddle caused during the running of the bicycle.

Preferably, in the vibration electric power generator described above, the magnet member is fixed to a saddle of the bicycle by a fixing member, one of the fixing member and the magnet member has a hole portion and the other thereof has a projection to be inserted into the hole portion along a front-back direction of the bicycle, and the hole portion has a shape of an ellipse that is long in a left-right direction of the bicycle.

By providing the vibration electric power generator to the saddle as described above, electric power can be generated using the vibrations of the saddle caused during the running of the bicycle. Further, by forming the hole portion into which the projection is inserted to have a shape of an ellipse, the magnet member can be relatively moved with respect to the iron core even when a force in all horizontal movements at any angle is exerted on the saddle simultaneously with a force in all vertical movements at any angle. Therefore, electric power can be generated effectively even when the saddle moves in all vertical movements at any angle and also in all horizontal movements at any angle simultaneously.

Preferably, in the vibration electric power generator described above, the plurality of magnets each have an identical thickness, and a width of a gap between the first pole and the second pole is identical to the thickness of the plurality of magnets.

By matching the width of the gap between the first pole and the second pole to the thickness of the plurality of magnets as described above, positions of the first pole and the second pole can be precisely matched to positions of the first plate-like member and the second plate-like member. Consequently, the resistance of the magnetic circuit can be reduced, and the vibrations can be used more effectively.

According to the present invention, electric power can be obtained using vibrations caused during running of a bicycle effectively without a loss of energy, as described above.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
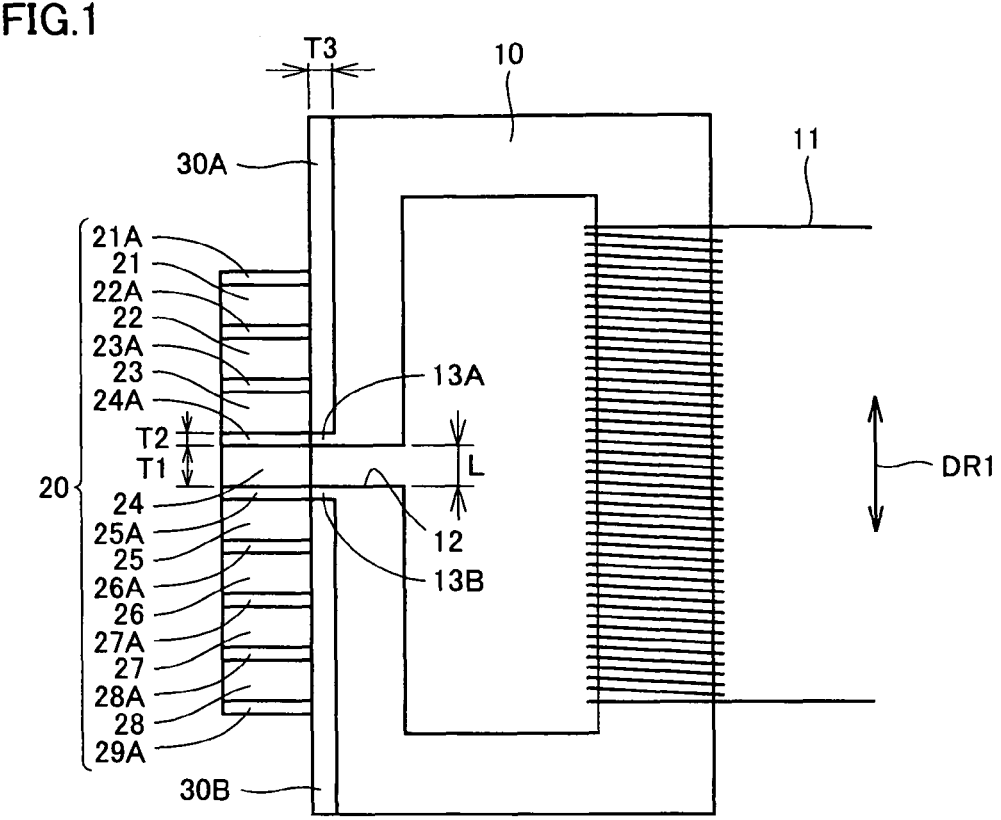
FIG. 1 shows a configuration of a vibration electric power generator in accordance with one embodiment of the present invention.

Hereinafter, an embodiment of the present invention will be described. It is to be noted that identical or corresponding parts will be designated by the same reference numerals, and the description thereof may not be repeated.

When a number, amount, or the like is referred to in the embodiment described below, the scope of the present invention is not necessarily limited to the number, amount, or the like that is referred to, unless otherwise specified. Further, in the embodiment described below, each component is not necessarily essential to the present invention, unless otherwise specified. Furthermore, when there are a plurality of embodiments below, it is originally intended to combine features of the embodiments as appropriate, unless otherwise specified.

A vibration electric power generator in accordance with the present embodiment is directed to supplying electric power required during running of a bicycle. For example, when the vibration electric power generator in accordance with the present embodiment is directly connected with an LED (light emitting diode), a flashing signal light can be configured without providing a flashing circuit. Further, when a secondary battery and a charge circuit are provided to perform charging during running in the daytime, continuous lighting in the nighttime can be provided. In addition, using the vibration electric power generator in accordance with the present embodiment and a solar battery in combination is also conceivable.

Figure 2:
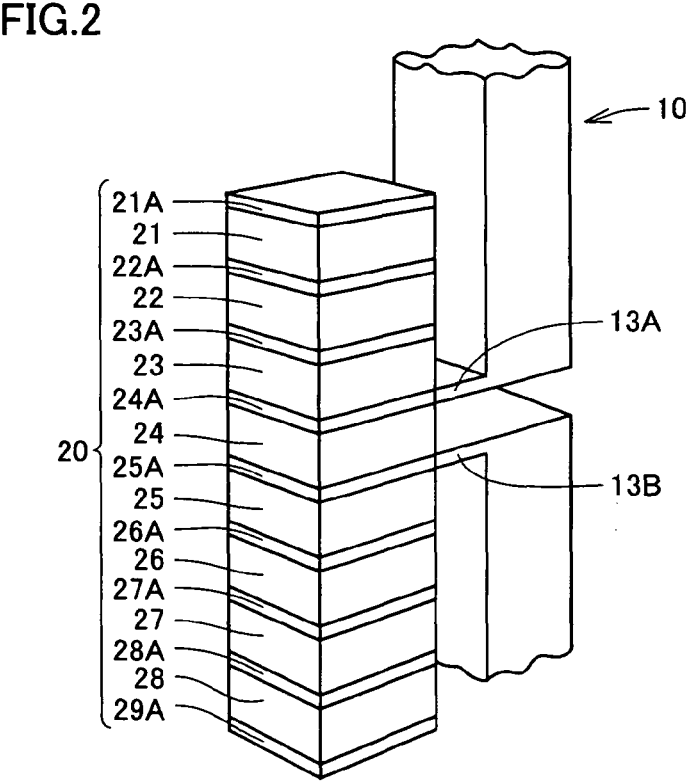
FIG. 2 is a perspective view showing a periphery of a portion where an iron core and a magnet member in the vibration electric power generator shown in FIG. 1 are in close contact, in an enlarged scale.

FIG. 1 shows a configuration of a vibration electric power generator in accordance with one embodiment of the present invention. FIG. 2 is a perspective view showing a periphery of a portion where an iron core 10 and a magnet member 20 in the vibration electric power generator shown in FIG. 1 are in close contact, in an enlarged scale. It is to be noted that FIG. 2 does not show nonmagnetic members 30A and 30B shown in FIG. 1.

Referring to FIGS. 1 and 2, the vibration electric power generator in accordance with the present embodiment includes iron core 10, magnet member 20, and nonmagnetic members 30A and 30B.

A coil 11 is wound around iron core 10. Iron core 10 has a shape in which a portion of a rectangular ring is cut to form a gap 12 (herein referred to as a generally C shape). Iron core 10 has protrusions 13A and 13B protruding toward magnet member 20 at both end portions of the generally C shape. Protrusions 13A and 13B are in close contact with magnet member 20.

Magnet member 20 includes a plurality of (eight in the example of FIG. 1) magnets 21 to 28, and magnetism collecting and permeative plates 21A to 29A. The plurality of magnets 21 to 28 and magnetism collecting and permeative plates 21A to 29A are stacked alternately along a vertical direction of a bicycle (i.e., a direction indicated by an arrow DR1). That is, the plurality of magnets 21 to 28 are sandwiched by magnetism collecting and permeative plates 21A to 29A, respectively. In other words, magnetism collecting and permeative plates 22A to 28A are sandwiched by the plurality of magnets 21 to 28, respectively. The thickness of magnets 21 to 28 (T1: for example, approximately 3 mm) is identical to the width of gap 12 (L) in iron core 10, and the thickness of magnetism collecting and permeative plates 21A to 29A (T2: for example, approximately 1 mm) is identical to the thickness of protrusions 13A and 13B. In the example of FIG. 1, the thickness of magnetism collecting and permeative plates 21A to 29A (T2) is formed to be smaller than the thickness of magnets 21 to 28 (T1). However, these thicknesses can be changed as appropriate, and the thickness of magnetism collecting and permeative plates 21A to 29A (T2) may be formed to be greater than the thickness of magnets 21 to 28 (T1).

In magnet member 20, the plurality of magnets 21 to 28 are stacked such that identical poles face each other. As a result, the plurality of magnetism collecting and permeative plates 21A to 29A are stacked such that north poles and south poles are formed alternately, for example, such that magnetism collecting and permeative plates 21A, 23A, 25A, 27A, and 29A serve as north poles and magnetism collecting and permeative plates 22A, 24A, 26A, and 28A serve as south poles. Preferably, magnetism collecting and permeative plates 21A to 29A are, for example, ferromagnets made of a material having a high magnetic permeability such as electromagnetic soft iron.

Nonmagnetic members 30A and 30B are fixed to iron core 10. Nonmagnetic members 30A and 30B are formed, for example, of a nonmagnetic material such as resin. The thickness of nonmagnetic members 30A and 30B (T3) is identical to the protruding amount of protrusions 13A and 13B of iron core 10. Accordingly, nonmagnetic members 30A and 30B are in close contact with magnet member 20 together with protrusions 13A and 13B of iron core 10.

During running of the bicycle, magnet member 20 vibrates with respect to a frame of the bicycle. In contrast, iron core 10 and nonmagnetic members 30A and 30B are in a fixed state with respect to the frame of the bicycle. Therefore, during the running of the bicycle, magnet member 20 is relatively moved with respect to iron core 10 and nonmagnetic members 30A and 30B along the direction indicated by arrow DR1. As a result, if magnet member 20 is moved, for example, downward with respect to iron core 10 from a state shown in FIG. 1 (i.e., a state in which magnetism collecting and permeative plate 24A as a south pole is in close contact with protrusion 13A, and magnetism collecting and permeative plate 25A as a north pole is in close contact with protrusion 13B), magnetism collecting and permeative plate 23A as a north pole is brought into close contact with protrusion 13A, and magnetism collecting and permeative plate 24A as a south pole is brought into close contact with protrusion 13B. Specifically, the direction of magnetic flux in iron core 10 is reversed by a vertical movements caused during the running of the bicycle. As a result, electromagnetic induction causes a current to flow into coil 11. Electric power can be generated by taking out the current. Based on the principle described above, electric power can be generated using vertical movements at any angle caused during running of a bicycle.

As described above, electric power can be generated by electromagnetic induction using vibrations caused during running of a bicycle, by switching polarities of protrusions 13A and 13B by the vibrations caused during the running of the bicycle and changing the direction of the magnetic flux in iron core 10 having coil 11 wound therearound. The magnetic flux density in magnetism collecting and permeative plates 21A to 29A can be increased by stacking the plurality of magnets 21 to 28 such that the identical poles face each other. Further, by establishing close contact between protrusions 13A and 13B of iron core 10 and magnetism collecting and permeative plates 21A to 29A of magnet member 20, a gap within a magnetic circuit between magnet member 20 and iron core 10 can be eliminated, and therefore the magnetic resistance can be reduced. Furthermore, by bringing nonmagnetic members 30A and 30B fixed to iron core 10 into close contact with magnet member 20, relative movement of magnet member 20 with respect to iron core 10 (in the direction indicated by arrow DR1) can be guided. Consequently, the vibrations caused during the running of the bicycle can be used effectively. That is, in the present embodiment, even when the vibrations are small in number and have a small amplitude, they can be used effectively to obtain electric power by bringing a movable portion (magnet member 20) into close contact with a fixed portion (iron core 10 and nonmagnetic member 30).

Further, since the vibrations are produced most stably and continuously during the running of the bicycle, the vertical vibrations caused during the running of the bicycle can be used effectively by stacking the plurality of magnets 21 to 28 vertically as described above.

Furthermore, by matching the width of the gap between protrusions 13A and 13B (L) to the thickness of magnets 21 to 28 (T1) and also matching the thickness of protrusions 13A and 13B to the thickness of magnetism collecting and permeative plates 21A to 29A (T2) as described above, positions of protrusions 13A and 13B can be precisely matched to positions of magnetism collecting and permeative plates 21A to 29A. Consequently, the resistance of the magnetic circuit can be reduced, and the vertical vibrations can be used more effectively.

Figure 3:
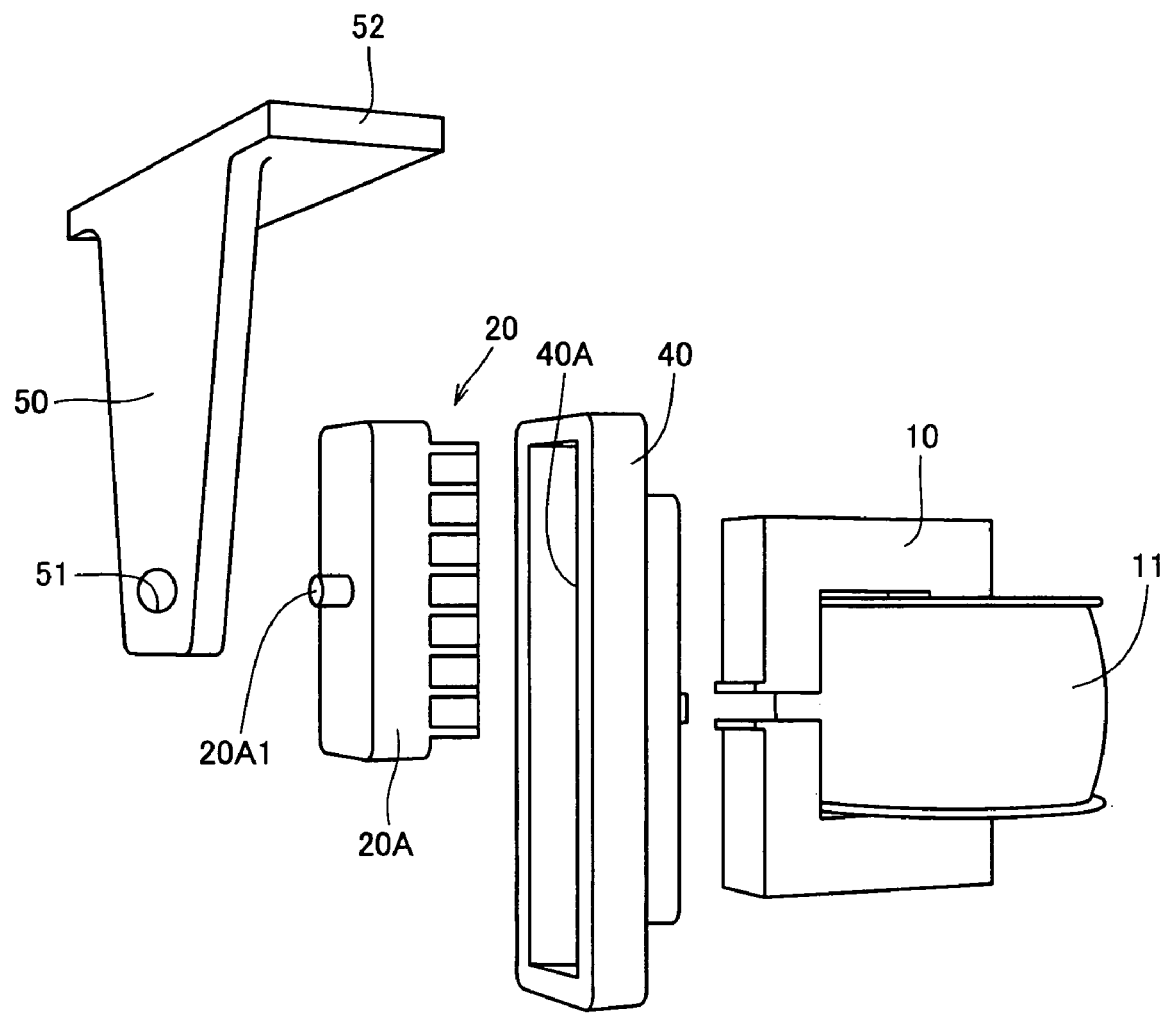
FIG. 3 is an exploded perspective view showing a mounting structure for the vibration electric power generator in accordance with one embodiment of the present invention.
Figure 4:
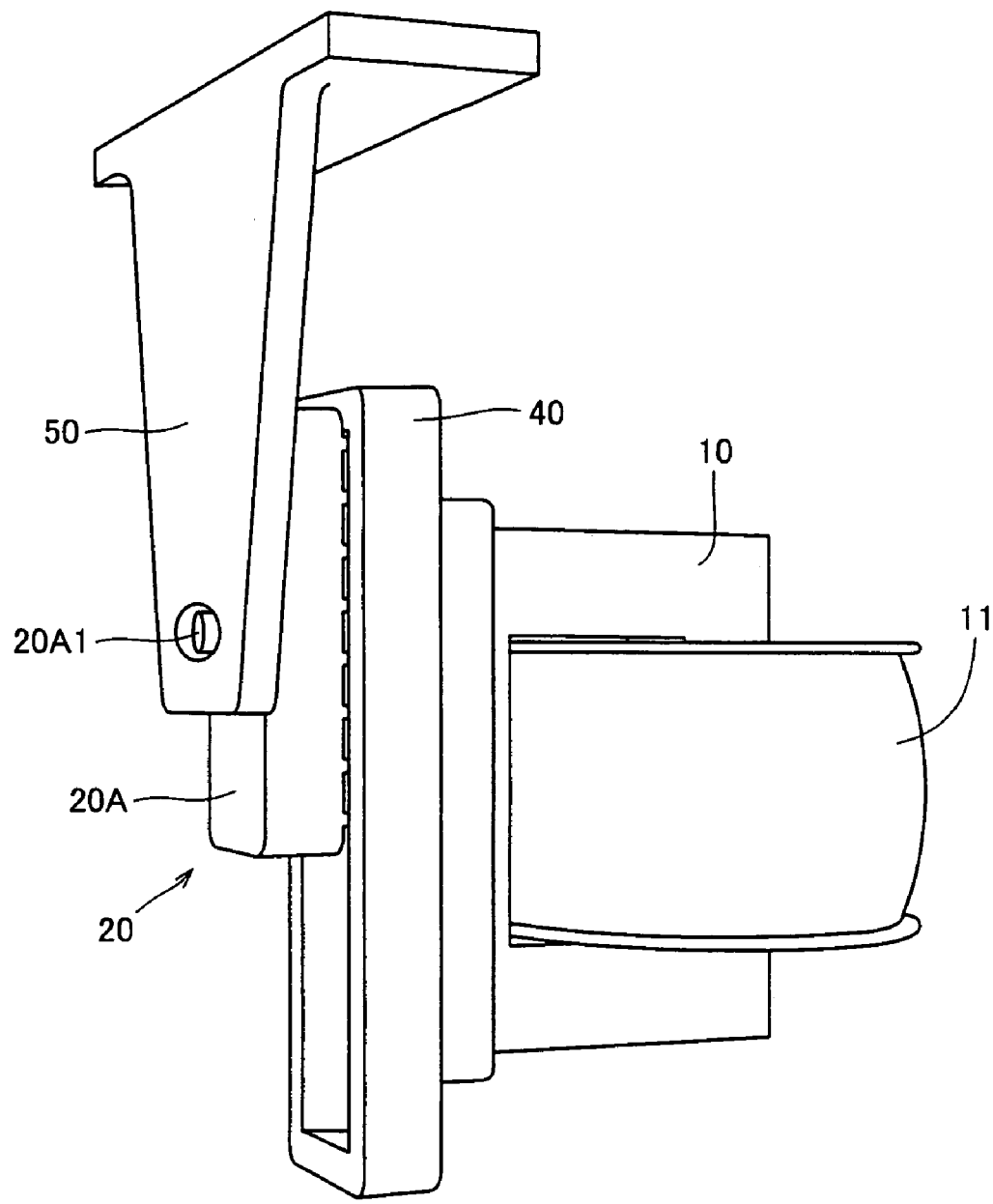
FIG. 4 is a perspective view showing the mounting structure for the vibration electric power generator in accordance with one embodiment of the present invention.

A mounting structure for the vibration electric power generator in accordance with the present embodiment will now be described with reference to FIGS. 3 and 4. Referring to FIGS. 3 and 4, a guide 40 is provided between iron core 10 and magnet member 20. Guide 40 has a guide hole 40A receiving iron core 10 and magnet member 20. Protrusions 13A and 13B of iron core 10 are in contact with magnet member 20 inside guide hole 40A.

Magnet member 20 has a holding portion 20A holding magnets 21 to 28 and magnetism collecting and permeative plates 21A to 29A, and a projection 20A1 protruding from holding portion 20A. A drive member 50 is coupled to magnet member 20. Drive member 50 has a hole portion 51 and a flange portion 52. Magnet member 20 and drive member 50 are coupled by inserting projection 20A1 of magnet member 20 into hole portion 51 of drive member 50. Further, drive member 50 is fixed to a saddle by fixing flange portion 52 to a saddle.

Iron core 10 and guide 40 are in a fixed state with respect to the frame of the bicycle. On the other hand, magnet member 20 is fixed to the saddle of the bicycle by drive member 50. During the running of the bicycle, the saddle vibrates with respect to the frame of the bicycle. Accordingly, during the running of the bicycle, magnet member 20 vibrates along with iron core 10 and guide 40. The vertical movements are guided by guide hole 40A. In the present embodiment, electric power is generated using the vertical movements of the saddle described above, by providing the vibration electric power generator to the saddle.

Figure 5:
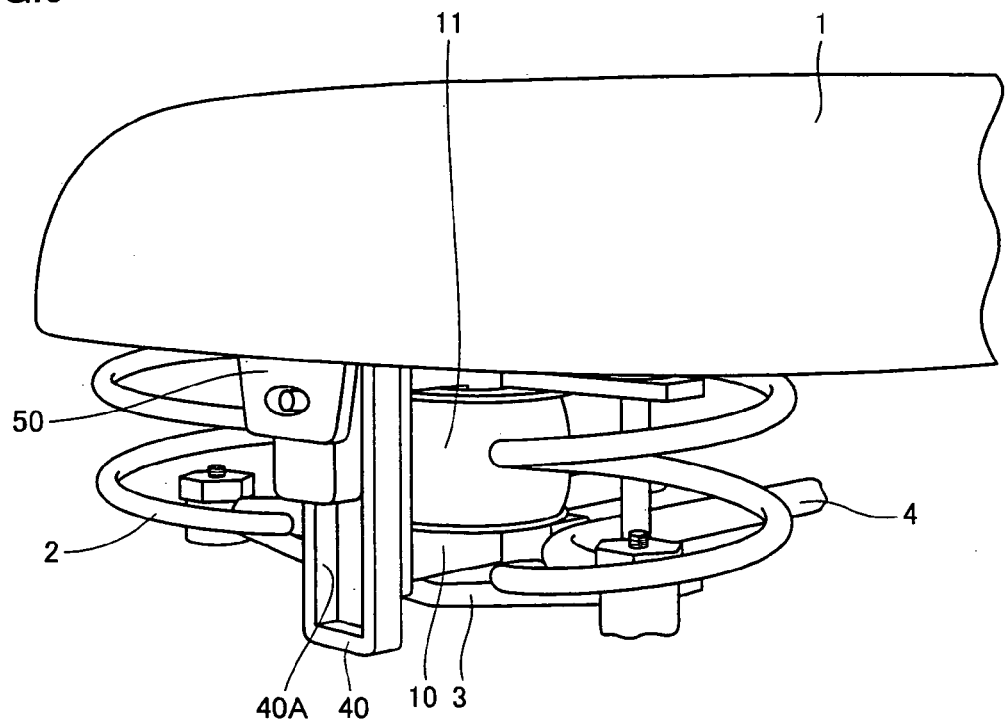
FIGS. 5 and 6 are perspective views showing a state in which the vibration electric power generator in accordance with one embodiment of the present invention is mounted to a saddle.
Figure 6:
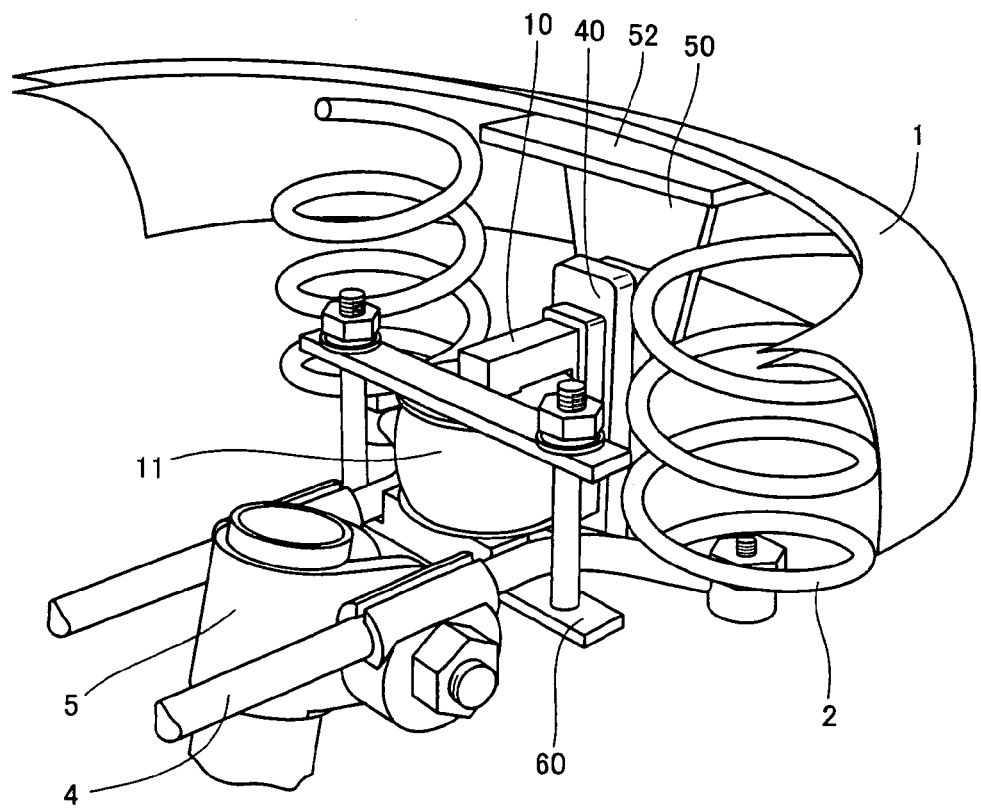

FIGS. 5 and 6 are perspective views showing a state in which the vibration electric power generator in accordance with the present embodiment is mounted to the saddle. Referring to FIGS. 5 and 6, a saddle 1 is fixed to a rear spring supporter 3 and a base wire 4 with a coil spring 2 as an "elastic member". Rear spring supporter 3 is fixed to base wire 4. Base wire 4 is fixed to a seat post clamp 5. Iron core 10 having coil 11 wound therearound is fixed to rear spring supporter 3 and base wire 4 using a mounting member 60.

Figure 7:
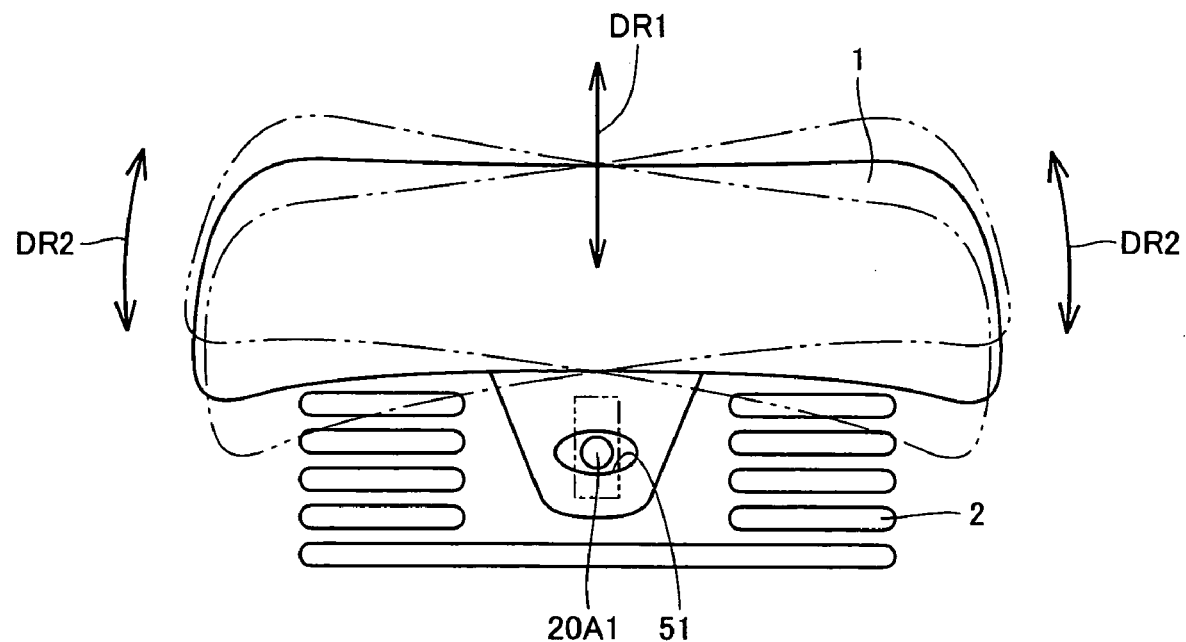
FIGS. 7 and 8 illustrate horizontal vibrations and vertical vibrations of the saddle.
Figure 8:
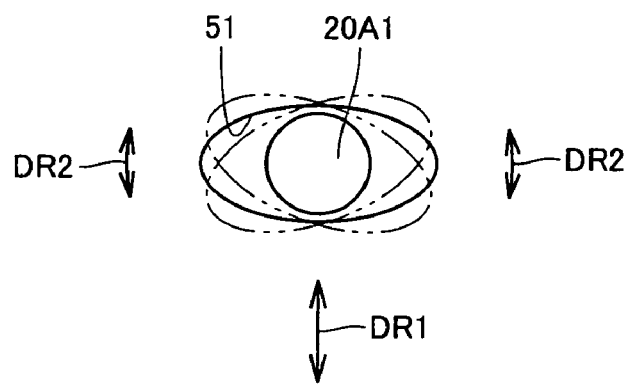

During the running of the bicycle, not only vertical vibrations (in the direction indicated by arrow DR1 in FIG. 7) but also horizontal vibrations (in a direction indicated by an arrow DR2 in FIG. 8) are caused in saddle 1. In the present embodiment, the horizontal vibrations are also used effectively. Specifically, as shown in FIGS. 7 and 8, hole portion 51 formed in drive member 50 is shaped as an ellipse that is long in a left-right direction of the bicycle, and thereby, magnet member 20 can be relatively moved with respect to iron core 10 even when a force in all horizontal movements at any angle (indicated by arrow DR2) is exerted on saddle I simultaneously with a force in all vertical movements at any angle (indicated by arrow DR1). Therefore, electric power can be generated effectively even when saddle 1 moves in all vertical movements at any angle and also in all horizontal movements at any angle simultaneously.

The above description can be summarized as follows. Specifically, a vibration electric power generator in accordance with the present embodiment is a vibration electric power generator generating electric power using vibrations caused during running of a bicycle, including: iron core 10 having coil 11 wound therearound; magnet member 20 formed by stacking the plurality of magnets 21 to 28, and relatively moved with respect to iron core 10 by the vibrations caused during the running of the bicycle; magnetism collecting and permeative plates 22A to 28A as a "plurality of plate-like members" having magnetic permeability and being inserted between the plurality of magnets 21 to 28; and nonmagnetic members 30A and 30B fixed to iron core 10 and being in close contact with magnet member 20. The plurality of magnets 21 to 28 are stacked such that identical poles face each other. Iron core 10 has protrusions 13A and 13B as a "first pole" and a "second pole", respectively, facing each other and provided at a location opposite to coil 11 and being in close contact with magnetism collecting and permeative plates 22A to 28A together with nonmagnetic members 30A and 30B. Magnetism collecting and permeative plates 22A to 28A include magnetism collecting and permeative plates 23A, 25A, and 27A as a "first plate-like member" sandwiched between north poles of the plurality of magnets, and magnetism collecting and permeative plates 22A, 24A, 26A, and 28A as a "second plate-like member" sandwiched between south poles of the plurality of magnets. Switching is realized, by the vibrations caused during the running of the bicycle, between a state in which protrusion 13A is attracted and brought into contact with north pole magnetism collecting and permeative plate 23A, 25A, or 27A and protrusion 13B is attracted and brought into contact with south pole magnetism collecting and permeative plate 22A, 24A, 26A, or 28A (a first state) and a state in which protrusion 13B is attracted and brought into contact with north pole magnetism collecting and permeative plate 23A, 25A, or 27A and protrusion 13A is attracted and brought into contact with south pole magnetism collecting and permeative plate 22A, 24A, 26A, or 28A (a second state).

More specifically, iron core 10 is fixed to base wire 4 fixed to seat post clamp 5 of the bicycle, and magnet member 20 is fixed to saddle 1 of the bicycle by drive member 50 as a "fixing member". Drive member 50 has hole portion 51, holding portion 20A of magnet member 20 has projection 20A1 to be inserted into hole portion 51 along a front-back direction of the bicycle, and hole portion 51 has a shape of an ellipse that is long in the left-right direction of the bicycle. It is to be noted that, contrary to the above description, drive member 50 may have a projection, and magnet member 20 may have a hole portion.

Although the present embodiment has described a case where a contact surface (close contact surface) between magnet member 20 and both of iron core 10 and nonmagnetic members 30A and 30B is a flat surface, the contact surface may be a curved surface. Further, although the present embodiment has described a case where the vibration electric power generator is provided under saddle 1 of the bicycle, the vibration electric power generator is also applicable to any other portions of the bicycle such as the inside of seat post clamp 5, the inside of a suspension, or the like.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vibration electric power generator generating electric power using vibrations caused during running of a bicycle, comprising:
   an iron core having a coil wound there around;
   a magnet member formed by stacking a plurality of magnets, and relatively moved with respect to said iron core by the vibrations caused during the running of said bicycle;
   a plurality of plate-like members having magnetic permeability and being inserted between said plurality of magnets; and
   a nonmagnetic member fixed to said iron core and being in close contact with said magnet member,
   wherein said plurality of magnets are stacked such that identical poles face each other,
   said iron core has a first pole and a second pole facing each other and provided at a location opposite to said coil and being in close contact with said plurality of plate-like members together with said nonmagnetic member,
   said plurality of plate-like members include a first plate-like member sandwiched between north poles of said plurality of magnets, and a second plate-like member sandwiched between south poles of said plurality of magnets, and
   switching is realized, by the vibrations caused during the running of said bicycle, from a first state in which said first pole is attracted and brought into contact with said first plate-like member and said second pole is attracted and brought into contact with said second plate-like member, to a second state in which said second pole is attracted and brought into contact with said first plate-like member and said first pole is attracted and brought into contact with said second plate-like member.

2. The vibration electric power generator according to claim 1, wherein said plurality of magnets are stacked vertically in all vertical movements at any angle.

3. The vibration electric power generator according to claim 1, wherein said magnet member is fixed to an underside of a saddle surface of said bicycle, and said iron core is fixed to a base wire fixed to a seat post clamp of said bicycle.

4. The vibration electric power generator according to claim 1, wherein
   said magnet member is fixed to an underside of a saddle surface of said bicycle by a fixing member,
   one of said fixing member and said magnet member has a hole portion and the other thereof has a projection to be inserted into said hole portion along a front-back direction of said bicycle, and
   said hole portion has a shape of an ellipse that is long in a left-right direction of said bicycle.

5. The vibration electric power generator according to claim 1, wherein said plurality of magnets each have an identical thickness, and
   a width of a gap between said first pole and said second pole is identical to the thickness of said plurality of magnets.

* * * * *